(12) United States Patent
Goto (10) Patent No.: US 12,069,477 B2
(45) Date of Patent: Aug. 20, 2024

(54) COMMUNICATION APPARATUS, COMMUNICATION METHOD, AND COMPUTER-READABLE STORAGE MEDIUM

(71) Applicant: CANON KABUSHIKI KAISHA, Tokyo (JP)

(72) Inventor: Fumihide Goto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 574 days.

(21) Appl. No.: 17/194,002

(22) Filed: Mar. 5, 2021

(65) Prior Publication Data

US 2021/0195420 A1    Jun. 24, 2021

Related U.S. Application Data

(63) Continuation of application No. PCT/JP2019/033202, filed on Aug. 26, 2019.

(30) Foreign Application Priority Data

Sep. 11, 2018   (JP) ................................. 2018-169660

(51) Int. Cl.
*H04W 12/06* (2021.01)
*H04W 12/04* (2021.01)
(Continued)

(52) U.S. Cl.
CPC ......... *H04W 12/069* (2021.01); *H04W 12/04* (2013.01); *H04W 76/11* (2018.02); *H04W 84/12* (2013.01)

(58) Field of Classification Search
CPC ... H04W 12/069; H04W 12/04; H04W 76/11; H04W 84/12; H04W 80/04
See application file for complete search history.

(56) References Cited

U.S. PATENT DOCUMENTS 10,230,522 B1 * 3/2019 Roths ...................... H04L 67/12
10,313,346 B1 * 6/2019 O'Neill ................... H04L 63/10
(Continued)

FOREIGN PATENT DOCUMENTS

CN    101911768 A * 12/2010    .......... H04W 76/041
CN    106464690 A    2/2017
(Continued)

OTHER PUBLICATIONS

Device Provisioning Protocol Specification, Version 1.0, Apr. 9, 2018, Apr. 2018, pp. 20-26, 33-34, 45-46, 53-55, 78-81.

*Primary Examiner* — Khalid M Almaghayreh
(74) *Attorney, Agent, or Firm* — CANON U.S.A., INC. IP Division (57) ABSTRACT

An instruction to start communication parameter sharing processing using a Wi-Fi Device Provisioning Protocol is received, processing for sharing a public key to be used in the communication parameter sharing processing is executed, and authentication processing is executed with a provision apparatus, which provides a communication parameter, by using the shared public key. After the authentication processing, a Configuration Request packet indicating a request for information about a communication layer upper than a communication layer of a wireless LAN, in addition to a request for a communication parameter used for connection based on the wireless LAN is generated and transmitted to the provision apparatus.

11 Claims, 8 Drawing Sheets

(51) Int. Cl.
*H04W 12/069* (2021.01)
*H04W 76/11* (2018.01)
*H04W 84/12* (2009.01)

(56) References Cited

U.S. PATENT DOCUMENTS

| | | | |
|---|---|---|---|
| 10,986,677 B2 * | 4/2021 | Jung | H05B 6/108 |
| 2008/0008116 A1 * | 1/2008 | Buga | H04L 41/5048 |
| | | | 370/328 |
| 2016/0150412 A1 * | 5/2016 | Liu | G06F 16/334 |
| | | | 370/338 |
| 2017/0238164 A1 * | 8/2017 | Pang | H04W 12/06 |
| | | | 455/41.3 |
| 2017/0295448 A1 | 10/2017 | McCann et al. | |
| 2018/0069851 A1 | 3/2018 | Terao | |
| 2018/0302366 A1 * | 10/2018 | Kaliski, Jr. | H04L 61/302 |
| 2019/0303065 A1 * | 10/2019 | Shibata | H04W 12/041 |
| 2019/0303071 A1 * | 10/2019 | Tsuji | H04L 63/0853 |
| 2019/0306919 A1 * | 10/2019 | Miyake | H04W 12/069 |
| 2019/0313246 A1 * | 10/2019 | Nix | H04W 80/10 |

FOREIGN PATENT DOCUMENTS

| | | |
|---|---|---|
| CN | 107223326 A | 9/2017 |
| JP | 2018042058 A | 3/2018 |

\* cited by examiner

```
{
"name": "MyDevice",
"wi-fi_tech": "infra",
"netRole": "sta",
"non wi-fiinfo": "ipv4+ipv6+dns"
}
```

FIG.6

```
{
"wi - fi_tech": "infra",
"discovery",
{
      "ssid": "mwifi",
}
"cred":
{
   "akm": "dpp",
   "signedConnector":
   "xxxxxxxxxxxxxxxxxxxxxxxxxxxxxxxxxxxxxxxxxxxxxxxxxxxxxxxxxxxxxxxxxxxxxxxxxxxxxxx
Xxxxxxxxxxxxxxxxxxxxxxxxxxxxxxxxxxx",
   "csign":
   {
      "kty": "EC",
      "crv": "P-256",
      "x": "yyyyyyyyyyyyyyyyyyyyyyyyyyyyyyyy",
      "y": "zzzzzzzzzzzzzzzzzzzzzzzzzzzzzzzz",
      "kid": "kkkkkkkkkkkkkkkkkkkkkkkkkkkkkkkkkkkkkkkkkkk",
   }
}
  "non wi-fiinfo":
  {
   "ipv4": "133.9.129.30",
   "ipv6": "fe80::b0ae:439f:9f35:457f%12",
   "dns_domain": "abc.co.jp",
  }
}
```

FIG.7

COMMUNICATION APPARATUS, COMMUNICATION METHOD, AND COMPUTER-READABLE STORAGE MEDIUM

CROSS-REFERENCE TO RELATED APPLICATIONS

This application is a Continuation of International Patent Application No. PCT/JP2019/033202, filed Aug. 26, 2019, which claims the benefit of Japanese Patent Application No. 2018-169660 filed Sep. 11, 2018, both of which are hereby incorporated by reference herein in their entireties.

BACKGROUND OF THE INVENTION

Field of the Invention

The present invention relates to a communication apparatus, a communication method, and a computer-readable storage medium.

Background Art

In recent years, there have been increasing cases where a radio communication function is mounted on communication apparatuses, such as a digital camera, a printer, a mobile phone, and a smartphone, and these communication apparatuses are used by being connected to a wireless network.

In order to connect a communication apparatus to a wireless network, it is necessary to set various communication parameters for an encryption method, an encryption key, an authentication method, an authentication key, and the like. As a technique for facilitating setting of these communication parameters, standards that provide a communication parameter setting protocol (for example, a Device Provisioning Protocol (hereinafter referred to as DPP) used in wireless networks based on the IEEE 802.11 standards (hereinafter referred to as Wi-Fi)) using a QR code® or the like have been formulated.

In the DPP discussed in Patent Literature 1, a configurator that provides a communication parameter provides an enrollee that receives the communication parameter with information necessary for connecting to an access point.

CITATION LIST

Patent Literature

PTL1: US-2017-0295448

The DPP specification specifies a setting for a communication parameter in a wireless LAN layer, but does not specify setting processing on information (e.g., an IP address or service information) in a communication layer upper than the wireless LAN layer. In addition, processing for executing setting of an IP address or service information using a protocol (e.g., DHCP or UPnP) for the communication layer upper than the wireless LAN layer, is troublesome.

SUMMARY OF THE INVENTION

Various embodiments of the present disclosure facilitate setting of information about a communication layer upper than a wireless LAN layer, in communication parameter sharing processing using DPP.

In various embodiments, a communication apparatus includes a reception unit configured to receive an instruction to start communication parameter sharing processing using a Wi-Fi Device Provisioning Protocol, an execution unit configured to execute processing for sharing a public key to be used in the communication parameter sharing processing according to the instruction, an authentication unit configured to execute authentication processing with a provision apparatus by using the public key shared in the processing executed by the execution unit, the provision apparatus being configured to provide a communication parameter, a generation unit configured to generate a Configuration Request packet indicating a request for information about a communication layer upper than a communication layer of a wireless LAN, in addition to a request for a communication parameter used for connection based on the wireless LAN after the authentication processing, and a transmission unit configured to transmit the Configuration Request packet generated by the generation unit to the provision apparatus.

Further features of the present invention will become apparent from the following description of exemplary embodiments with reference to the attached drawings.

DESCRIPTION OF THE EMBODIMENTS

A communication apparatus according to an exemplary embodiment of the present invention will be described in detail below with reference to the drawings. The following exemplary embodiment illustrates an example where a wireless LAN system compliant with the Institute of Electrical and Electronics Engineers, Inc. (IEEE) 802.11 series is used. However, the communication configuration is not limited to a wireless LAN compliant with IEEE 802.11.

Figure 3:
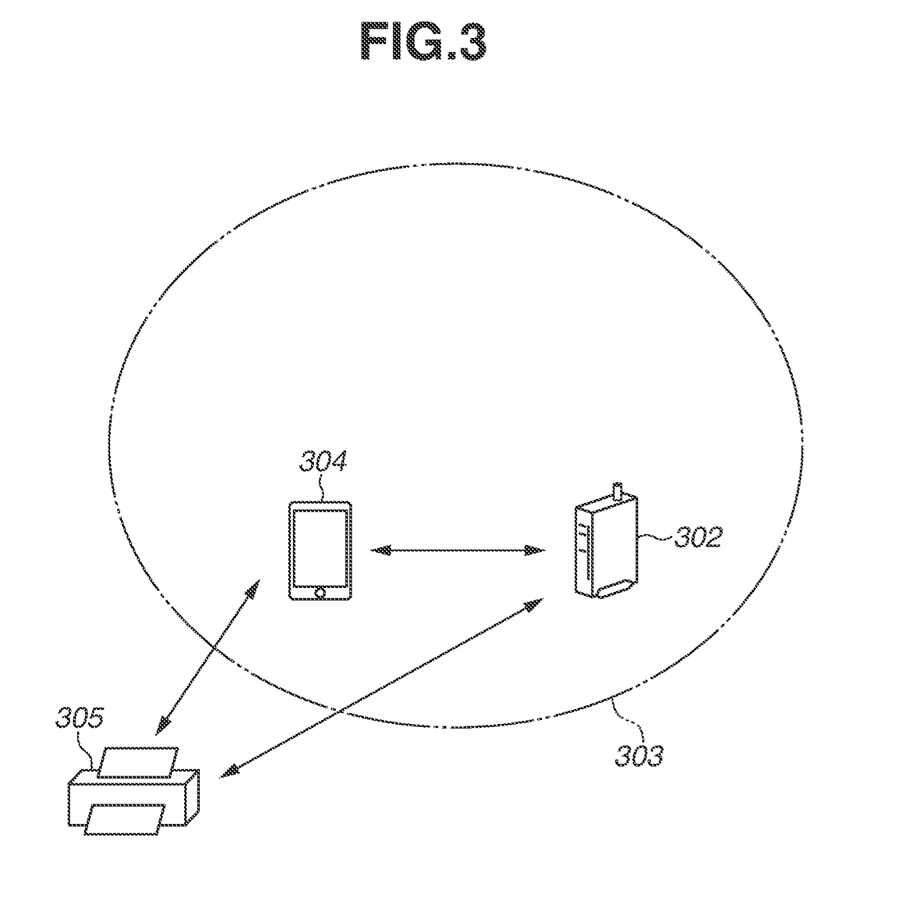
FIG. 3 is a diagram illustrating an example of a configuration of a communication system.

FIG. 3 is a diagram illustrating a configuration of a communication system according to the present exemplary embodiment. The communication system includes an access point 302, a smartphone 304, a printer 305, and a wireless LAN network 303 (hereinafter referred to as the network 303). The following exemplary embodiment describes processing for causing the printer 305 to participate in the network 303 formed by the access point 302. The smartphone 304 operates as a configurator specified in DPP and provides the printer 305 with information for connecting to the access point 302.

Note that the following description is made assuming that the smartphone, the access point, and the printer are used as communication apparatuses in the communication system according to the present exemplary embodiment. However, other communication apparatuses, such as a mobile phone, a camera, a PC, a video camera, a smart watch, and a PDA, may also be used. In addition, the following description is made assuming that the number of apparatuses in the communication system is three. However, two or four or more apparatuses may be used.

Figure 1:
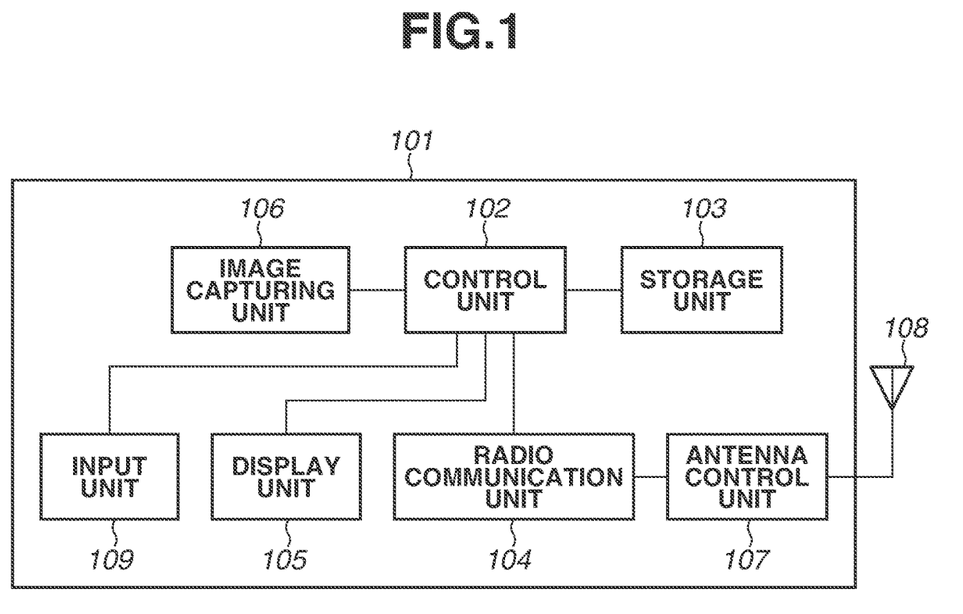
FIG. 1 is a diagram illustrating a hardware configuration of a communication apparatus.

Next, a hardware configuration of each communication apparatus in the communication system illustrated in FIG. 3 according to the present exemplary embodiment will be described with reference to FIG. 1. In FIG. 1, reference numeral 101 denotes an entire apparatus. Reference numeral 102 denotes a control unit that controls the entire apparatus by executing control programs stored in a storage unit 103. The control unit 102 is composed of, for example, one or more central processing units (CPUs) or the like. Reference numeral 103 denotes a storage unit that stores various kinds of information such as control programs, image data, and communication parameters to be executed by the control unit 102. Various operations to be described below are performed such that the control programs stored in the storage unit 103 are executed by the control unit 102. The storage unit 103 is composed of, for example, one or more storage media, such as a ROM, a RAM, a HDD, a flash memory, and a detachable SD card.

Reference numeral 104 denotes a radio communication unit for establishing wireless LAN communication compliant with IEEE 802.11 series. The radio communication unit 104 is composed of a chip for radio communication. Reference numeral 105 denotes a display unit for performing various display operations. The display unit includes a function, such as a LCD or a LED, which enables output of visually recognizable information, or a function, such as a speaker, which enables output of sound. The display unit 105 includes a function for outputting at least one of visual information and sound information. The display unit 105 includes a video RAM (VRAM) for holding image data corresponding to visual information to be displayed in the case of displaying visual information. The display unit 105 performs display control for causing an LCD or LED to continuously display the image data stored in the VRAM.

Reference numeral 106 denotes an image capturing unit which is composed of an image sensor, a lens, and the like and is used to take photographs and moving images. The image capturing unit 106 captures an image of a barcode or a two-dimensional code such as a QR Code®. Reference numeral 107 denotes an antenna control unit that controls an output from an antenna 108. Reference numeral 108 denotes an antenna with which communication in a 2.4 GHz band and/or a 5 GHz band for communication via a wireless LAN can be performed. Reference numeral 109 denotes an input unit that is used for a user to perform various input operations and the like and to operate the communication apparatus 101. The input unit 109 stores a flag corresponding to an input in a memory such as the storage unit 103. The example illustrated in FIG. 1 is merely an example, and the communication apparatus may include a hardware configuration other than that described above. For example, when the communication apparatus is a printer, the communication apparatus may include a printing unit in addition to the components illustrated in FIG. 1. Further, when the communication apparatus 101 corresponds to the access point 302, the image capturing unit 106 and the display unit 105 may be omitted.

Figure 2:
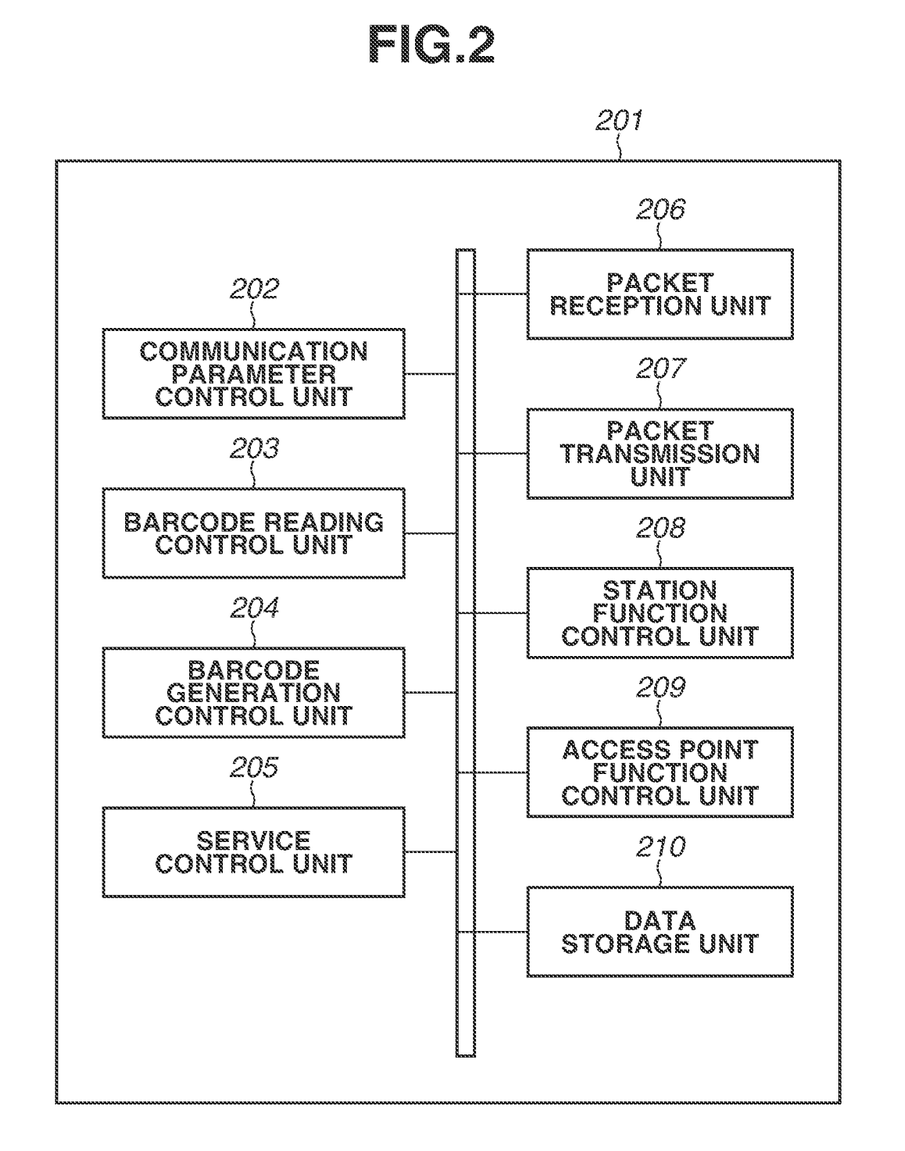
FIG. 2 is a diagram illustrating a configuration of each software function in the communication apparatus.

FIG. 2 is a block diagram illustrating an example of a configuration of each software functional block for executing a communication control function to be described below. In the present exemplary embodiment, the functional blocks in each communication apparatus are stored as programs in the storage unit 103, and the functions are implemented such that the control unit 102 executes the programs. The control unit 102 realizes the functions by controlling each piece of hardware and performing calculations and processing on information according to the control programs. Note that some or all of the functional blocks may be configured as hardware. In this case, some or all of the functional blocks are configured using, for example, an application specific integrated circuit (ASIC).

In FIG. 2, reference numeral 201 denotes an entire software functional block. Reference numeral 202 denotes a communication parameter control unit. The communication parameter control unit 202 executes communication parameter sharing processing for sharing communication parameters between apparatuses. In the communication parameter sharing processing, a provision apparatus provides a reception apparatus with a communication parameter for establishing radio communication. In this case, the communication parameter includes a radio communication parameter required for establishing wireless LAN communication. Specifically, the communication parameter includes at least one of a Service Set Identifier (SSID) as a network identifier, an encryption method, an encryption key, an authentication method, and an authentication key. The communication parameter may also include a connector specified in the DPP, a MAC address, a PSK, a passphrase, an IP address for communication in an IP layer, information required for a service to be executed in an upper layer, and the like. Assume that the communication parameter sharing processing to be executed by the communication parameter control unit 202 corresponds to the DPP.

Reference numeral 203 denotes a barcode reading control unit. The barcode reading control unit 203 analyzes the image of a barcode or a two-dimensional code, such as a QR code, which is captured by the image capturing unit 106, and acquires encoded information. The image capturing unit 106 captures an image of code information including a public key to be used when the communication parameter sharing processing is executed, and the barcode reading control unit 203 acquires the captured image. The code information may be a two-dimensional code such as a CP code or a QR code, or may be a one-dimensional code such as a barcode. The barcode reading control unit 203 analyzes the image of the code information acquired by image capturing by the image capturing unit 106, and acquires encoded information. In the present exemplary embodiment, the code information may include information to be used in the communication parameter sharing processing. The information to be used in the communication parameter sharing processing is information such as a public key to be used for authentication processing, or an identifier for each apparatus. The public key is information that is used to enhance the security in the communication parameter sharing processing, and information such as a certificate or a password may be used. In this case, the public key is one type of encryption key used for a public key encryption method.

Reference numeral 204 denotes a barcode generation control unit. The barcode generation control unit 204 generates an image of a barcode or a two-dimensional code, such as a QR code, and performs control for displaying the generated barcode, two-dimensional code, or the like on the display unit 105. The barcode generation control unit 204 generates code information including information, such as a public key or an identifier for each communication apparatus, which is used when the communication parameter sharing processing is executed. Reference numeral 205 denotes a service control unit in an application layer. The application layer described herein refers to a service provision layer in an upper layer, i.e., a fifth or higher layer, in an OSI reference model (seven layers). In other words, the service control unit 205 executes printing processing, image streaming processing, file transfer processing, and the like using radio communication by the radio communication unit 104.

Reference numeral 206 denotes a packet reception unit, and reference numeral 207 denotes a packet transmission unit. The packet reception unit 206 and the packet transmission unit 207 control reception and transmission of various packets including a communication protocol in an upper layer. Further, the packet reception unit 206 and the packet transmission unit 207 control the radio communication unit 104 to transmit and receive packets compliant with IEEE 802.11 standards to and from an opposing apparatus.

Reference numeral 208 denotes a station function control unit which provides a station (STA) function for operating as an STA in an infrastructure mode defined in IEEE 802.11 standards. The STA function control unit 208 executes authentication/cryptography processing and the like when operating as the STA. Reference numeral 209 denotes an access point function control unit which provides an access point (AP) function for operating as an AP in the infrastructure mode defined in IEEE 802.11 standards. The AP function control unit 209 forms a wireless network and performs authentication/cryptography processing on the STA, management of the STA, and the like. Reference numeral 210 denotes a data storage unit which controls writing and reading of the software itself and information such as communication parameters and barcodes to and from the storage unit 103. Further, when the communication apparatus 101 corresponds to the access point 302, the barcode reading unit 203 and the like may be omitted.

An operation of the communication system including the above-described configuration will be described. The access point 302 constructs the network 303, and the smartphone 304 holds the communication parameter that enables connection to the access point 302. If the access point 302 is not compliant with the DPP, an existing protocol, such as WPS or AOSS, may be used as a method for acquiring the communication parameter in the smartphone 304. If the access point 302 is compliant with the DPP, for example, an automatic setting using the DPP may be used. Alternatively, the user may manually input the communication parameter using the input unit 109.

Figure 4:
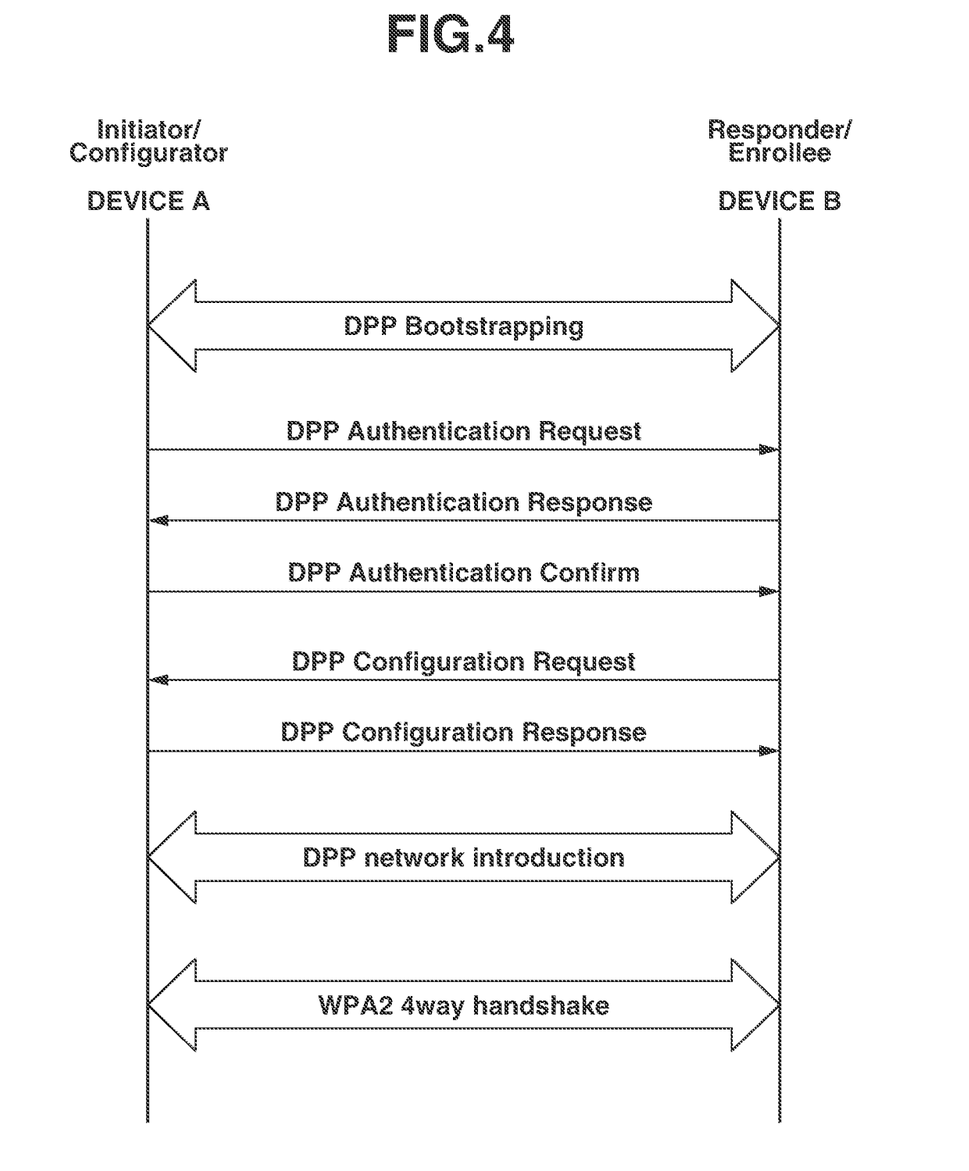
FIG. 4 is a sequence diagram illustrating an operation between communication apparatuses according to an exemplary embodiment of the present invention.

FIG. 4 illustrates an operation sequence between certain two communication apparatuses. A device A is a configurator that provides the communication parameter, and corresponds to the smartphone 304 illustrated in FIG. 3.

A device B corresponds to an enrollee that receives the communication parameter, and corresponds to the access point 302 or the printer 305 illustrated in FIG. 3. Hereinafter, a communication parameter provision apparatus is referred to as the configurator, and a communication parameter reception apparatus is referred to as the enrollee.

DPP Bootstrapping processing is executed between the device A and the device B based on the DPP specification, and then DPP Authentication processing is executed.

After that, DPP Configuration processing is executed. In the DPP Configuration processing, the enrollee first performs DPP Configuration Request transmission processing. The configurator that has received this DPP Configuration Request checks the contents and transmits a DPP Configuration Response to the enrollee.

The DPP Configuration processing will be described in detail below with reference to FIGS. 7 and 8.

Further, when the device A and the device B are directly connected, DPP Network Introduction processing is executed and then WPA2 4Way Handshake processing is executed. Thus, connection processing is completed.

Figure 7:
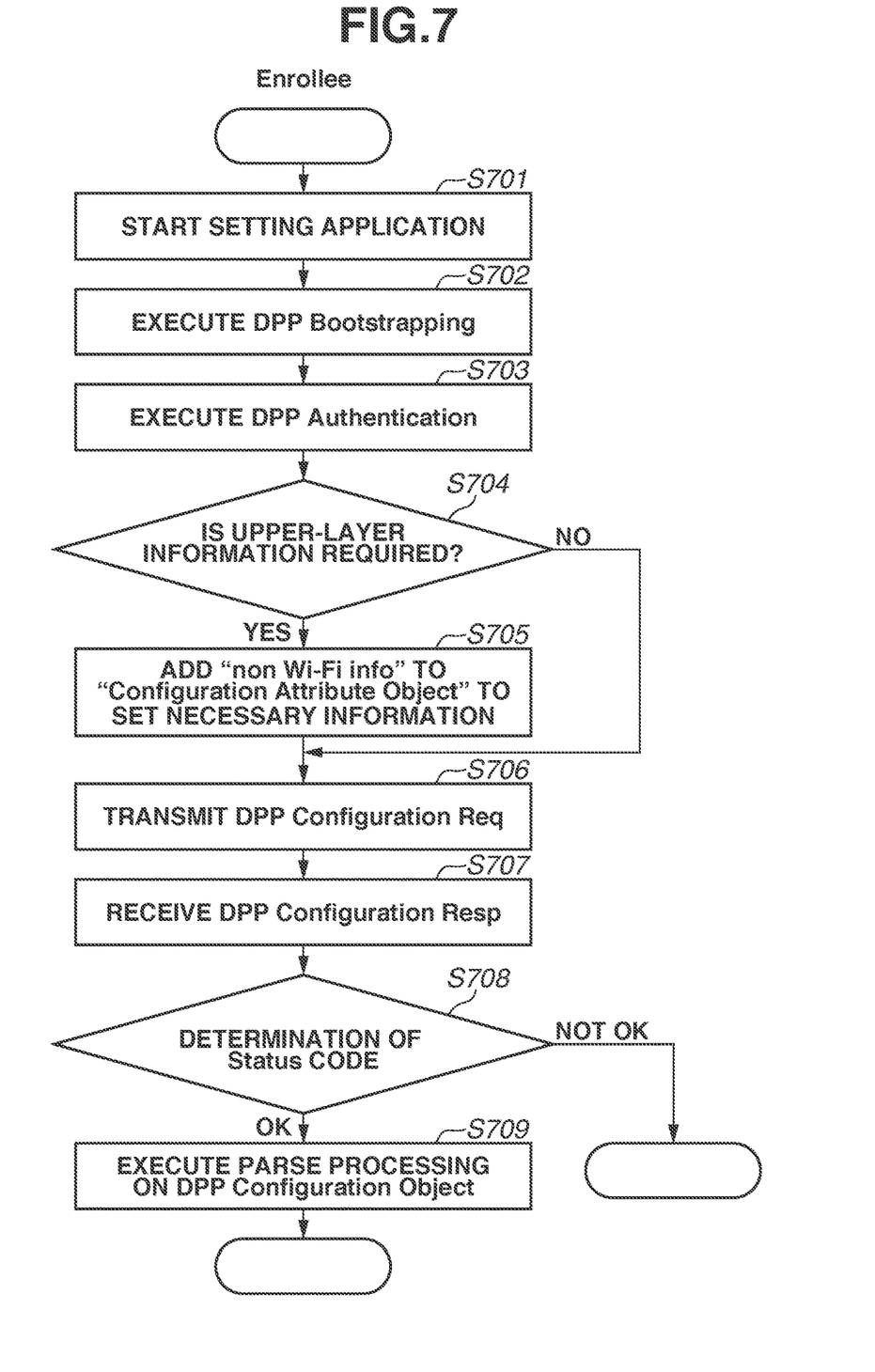
FIG. 7 is a flowchart (part 1) illustrating an operation of the communication apparatus according to the present exemplary embodiment.

FIG. 7 is a flowchart illustrating an example of an operation flow of the communication apparatus that operates as the enrollee that is the device B illustrated in FIG. 4, or the communication parameter reception apparatus.

To execute the communication parameter sharing processing using DPP, the enrollee starts a communication parameter setting application when the display unit 105 and the input unit 109 are operated by the user and the enrollee receives an instruction to start the DPP (step S701). After that, the enrollee executes the DPP Bootstrapping processing specified in the DPP specification (step S702). The DPP Bootstrapping processing is processing for sharing a public key between the enrollee and the configurator by using a QR code. Specifically, one of the enrollee and the configurator generates a QR code by encoding information about the held public key, and the other of the enrollee and the configurator obtains information about the public key by reading the QR code. Note that in the DPP Bootstrapping processing, the public key may be shared using radio communication, such as Wi-Fi, Near Field Communication (NFC), or Bluetooth®, instead of using a QR code.

Then, the enrollee executes the DPP Authentication processing (step S703). The DPP Authentication processing is processing for performing authentication between the enrollee and the configurator by using information about the public key shared in the above-described DPP Bootstrapping processing.

Next, the enrollee determines whether a parameter other than the communication parameter used for connection based on the wireless LAN is also required as the communication parameter (step S704). In this case, a parameter other than the communication parameter used for connection based on the wireless LAN is, for example, an IP address, a DNS record, or application service information (information such as UPnP or Bonjour), and indicates information about a communication layer that is upper than a wireless LAN layer.

Figure 5:
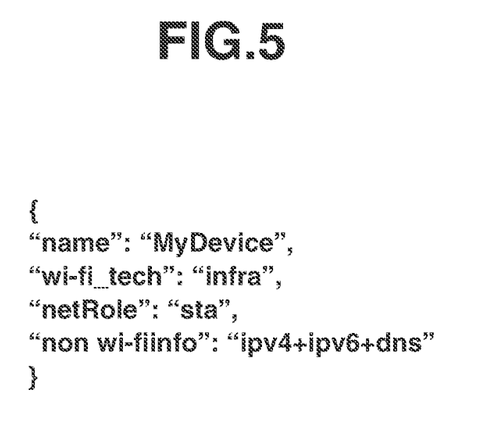
FIG. 5 is a diagram illustrating an example of request information from an enrollee device according to the present exemplary embodiment.

In step S705, the enrollee generates a Configuration Attribute Object. Specifically, as a result of determination in step S704, if it is determined that the information is required, the enrollee sets a non-Wi-Fi information request list, as illustrated in FIG. 5, to the Configuration Attribute Object specified in the DPP specification. In the example illustrated in FIG. 5, an IPv4 address, an IPv6 address, and a DNS record are requested as the above-described information about the upper layer.

On the other hand, as a result of determination in step S704, if the information about the communication layer upper than the wireless LAN layer is not required, the enrollee does not set the non-Wi-Fi information request list to the Configuration Attribute Object.

In step S706, the enrollee transmits, to the configurator, a DPP Configuration Request packet including the Configuration Attribute Object generated in step S705.

After the DPP Configuration Request packet is transmitted, the enrollee receives a DPP Configuration Response packet from the configurator (step S707). Note that if the response packet is not received from the opposing configurator after the packet is transmitted in step S706, the enrollee performs timeout processing or packet retransmission processing.

In this case, if the enrollee receives the DPP Configuration Response packet in step S707, the enrollee refers to a "DPP Status" field set in the packet (step S708). This indicates the processing result in the configurator, and indicates whether the processing is successful or unsuccessful.

In step S708, if a value indicating "successful" is stored, the enrollee executes parse processing on a DPP Configuration Object, and acquires communication parameter information sent from the configurator.

In this case, if the value indicating "successful" is not stored in step S708, the enrollee terminates the processing at the time. In some cases, only processing for non-Wi-Fi information is unsuccessful and processing for Wi-Fi information is successful. Accordingly, the presence or absence of Wi-Fi information may be checked.

The enrollee sets information about the communication parameter acquired in step S709 in the enrollee. If the acquired communication parameter includes pieces of information about an upper layer, such as an IP address, not only information about the wireless LAN layer (an SSID, an encryption key, or the like), but also these pieces of information are set. Thus, the re-execution of communication protocol processing in an upper layer of a DHCP or the like, to set an IP address to the enrollee may be omitted. If the acquired communication parameter does not include information about the upper layer, the enrollee sets information (an SSID, an encryption key, or the like) about the wireless LAN layer.

Figure 8:
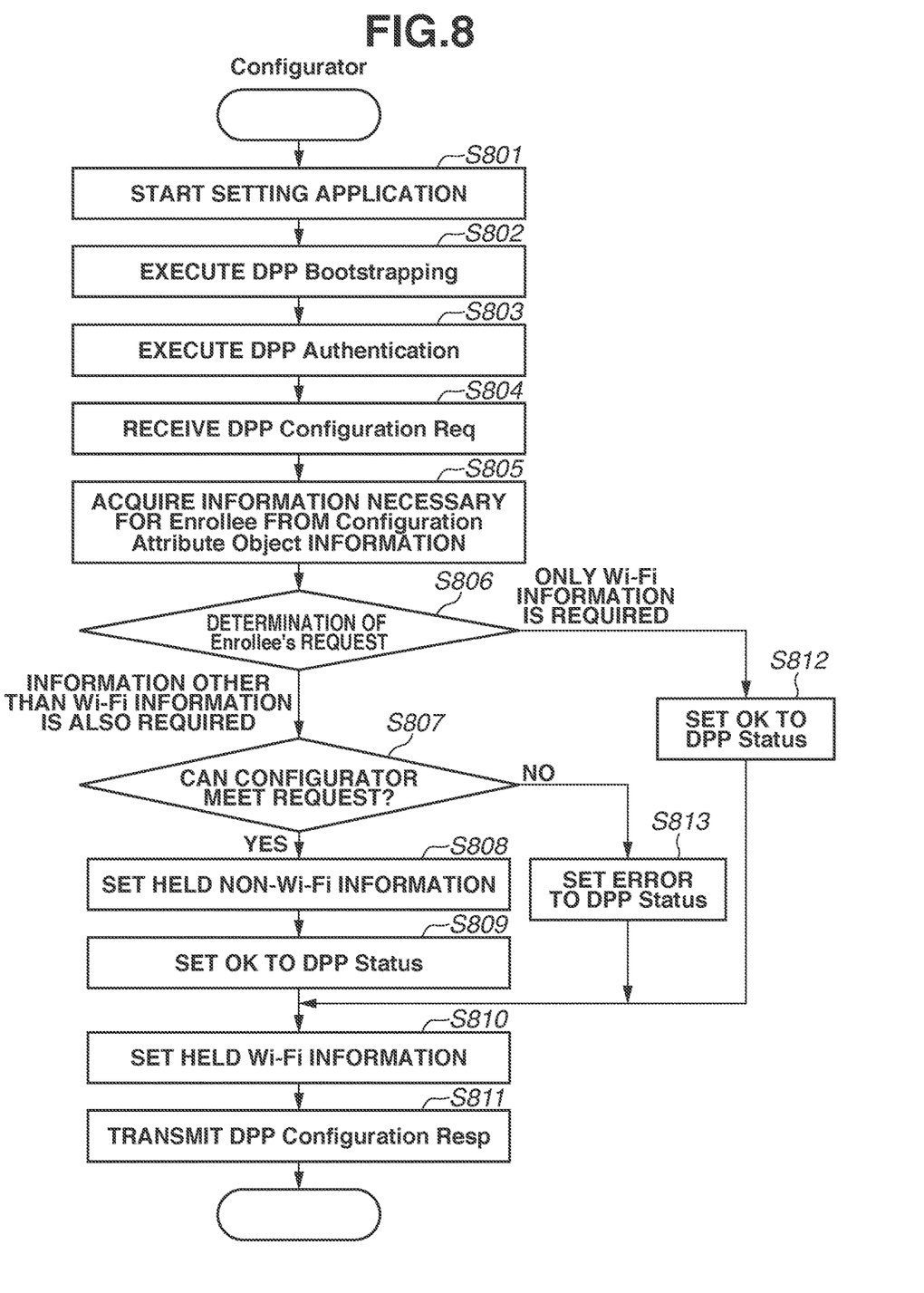
FIG. 8 is a flowchart (part 2) illustrating an operation of the communication apparatus according to the present exemplary embodiment.

FIG. 8 is a flowchart illustrating an example of an operation flow of the communication apparatus that operates as the device A illustrated in FIG. 4, or the configurator serving as the communication parameter provision apparatus.

To execute the communication parameter sharing processing using DPP, the configurator starts the communication parameter setting application when the display unit 105 and the input unit 109 are operated by the user and the configurator receives an instruction to start the DPP (step S801). After that, the configurator executes the DPP Bootstrapping processing specified in the DPP specification (step S802). The DPP Bootstrapping processing has been described above.

Then, the configurator executes the DPP Authentication processing (step S803). The DPP Authentication processing has been described above.

After that, the configurator receives the DPP Configuration Request packet transmitted from the enrollee (step S804). In the DPP Configuration Request packet, the type of information requested to be received by the enrollee is set to the Configuration Attribute Object. Accordingly, the configurator performs parse processing on the Configuration Attribute Object, and checks information necessary for the enrollee (step S805).

The configurator determines the request from the enrollee based on information about the Configuration Attribute Object acquired in step S805 (step S806). In this case, if it is determined that the enrollee has requested only Wi-Fi information, the configurator sets "OK" as the DPP Status set in the DPP Configuration Response packet (step S812). After that, the configurator sets, to the DPP Configuration Object, the Wi-Fi information which is held in the configurator and is desired to be set in the enrollee (step S810). Then, the configurator transmits the DPP Configuration Response packet to the enrollee as a response to the DPP Configuration Request packet (step S811). The DPP Configuration Response packet includes the DPP Configuration Object.

On the other hand, in step S806, if it is determined that the enrollee has requested information other than the Wi-Fi information, the configurator determines whether the configurator can meet the request (step S807).

In step S807, if it is determined that the configurator can meet the request, the configurator sets, to the DPP Configuration Object, the information which is held in the configurator and is requested from the enrollee (step S808). Further, the configurator sets "OK" as the DPP Status set in the DPP Configuration Response packet (step S809).

Figure 6:
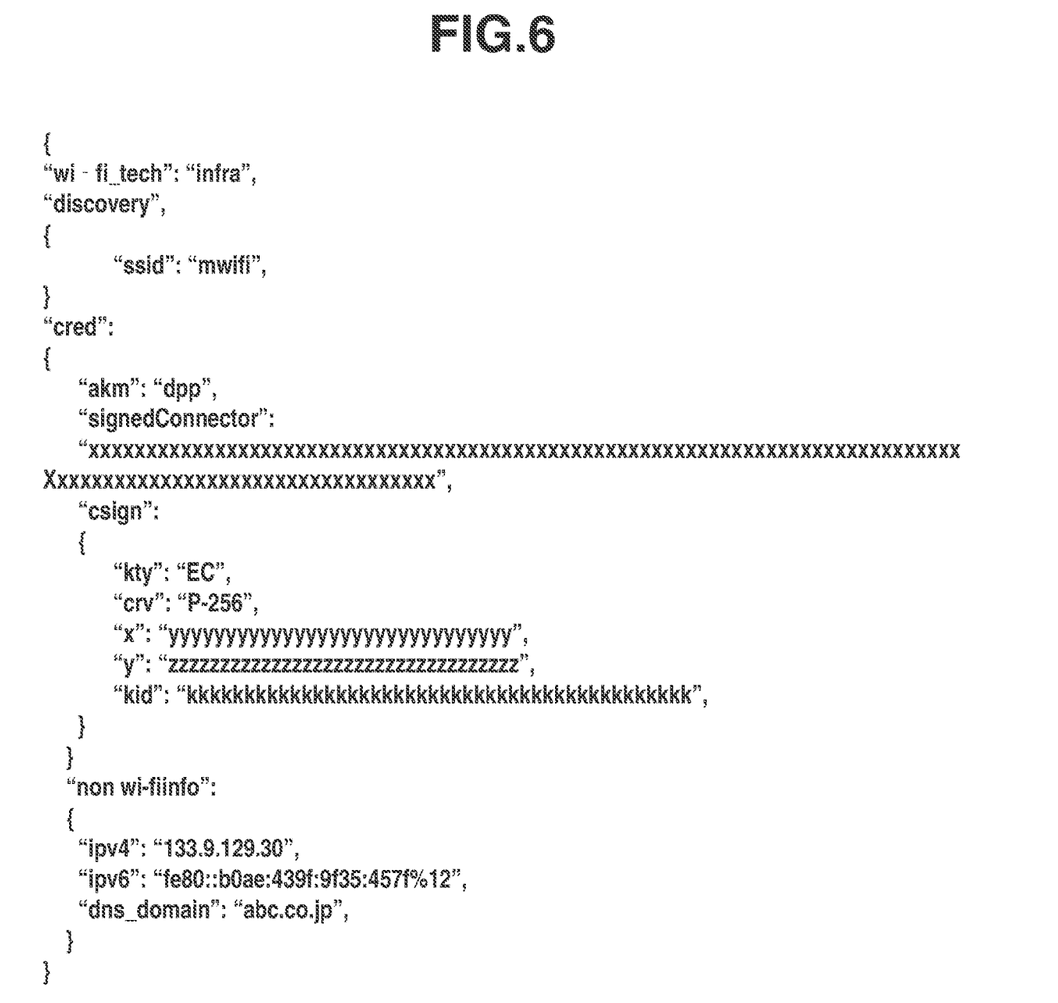
FIG. 6 is a diagram illustrating an example of response information from a configurator device according to the present exemplary embodiment.

Further, the configurator additionally sets the Wi-Fi information desired to be set in the enrollee to the DPP Configuration Object (step S810). Then, the DPP Configuration Response packet is transmitted to the enrollee (step S811). The DPP Configuration Response packet includes the DPP Configuration Object. FIG. 6 illustrates an example of the DPP Configuration Object included in the DPP Configuration Response packet that is transmitted to the enrollee by the configurator. The DPP Configuration Object illustrated in FIG. 6 includes not only the communication parameter, such as an SSID, which is required for connecting to the wireless LAN, but also information about the communication layer, which is an upper layer of the wireless LAN layer, such as an IPv4 address or an IPv6 address.

In step S807, if it is determined that the configurator cannot meet the request, the configurator sets "error" as the DPP Status set in the DPP Configuration Response packet. After that, the configurator additionally sets the Wi-Fi information desired to be set in the enrollee to the DPP Configuration Object (step S810). Then, the DPP Configuration Response packet is transmitted to the enrollee (step S811). Note that if the configurator cannot transmit non-Wi-Fi information to the enrollee and a setting for preventing Wi-Fi information from being transmitted is made in the configurator, the processing of step S810 may be skipped after step S813. In this case, the DPP Configuration Response including only error information is transmitted.

As described above, according to the present exemplary embodiment, in the communication parameter setting using DPP, not only the parameter for the wireless LAN layer, but also the parameter for the upper layer, such as an IP address or DNS information, can be set.

Other Exemplary Embodiments

The exemplary embodiment described above describes a case where communication between apparatuses is established by wireless LAN communication compliant with IEEE 802.11. However, the present invention is not limited to this case. For example, the present invention may be carried out using a radio communication medium of a wireless USB, Bluetooth®, ZigBee®, NFC, or the like. In this case, UWB includes a wireless USB, Wireless 1394, and WINET, and the like.

According to the present invention, it is possible to facilitate setting of information about a communication layer, which is an upper layer of a wireless LAN layer, in communication parameter sharing processing using DPP.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
one or more processors; and
one or more memories including instructions that, when executed by the one or more processors, cause the communication apparatus to:
receive an instruction to start communication parameter sharing processing using a wireless-network-device provisioning protocol;
execute processing for sharing a public key to be used in the communication parameter sharing processing according to the instruction;
execute authentication processing with a provision apparatus by using the public key shared in the processing executed by the processing for sharing a public key, the provision apparatus being configured to provide a communication parameter;
after the authentication processing and in a case where a predetermined condition is met, generate one wireless-network-device-provisioning-protocol Configuration Request packet indicating (i) a request for information including at least an Internet Protocol (IP) address about a communication layer upper than a communication layer of a wireless Local Area Network (LAN), in addition to (ii) a request for a communication parameter used for connecting to another apparatus based on the wireless LAN;
transmit the Configuration Request packet generated by the generating to the provision apparatus;
receive one wireless-network-device-provisioning-protocol Configuration Response packet transmitted from the provision apparatus in response to the Configuration Request packet transmitted by the communication apparatus; and set, at the communication apparatus, the communication parameter used for connection based on the wireless LAN acquired from the Configuration Response packet received and the information including at least the IP address about the communication layer upper than the communication layer of the wireless LAN.

2. The communication apparatus according to claim 1, wherein the instructions further cause the communication apparatus to determine whether information about the communication layer upper than the communication layer of the wireless LAN is required, and
wherein
in a case where the communication apparatus determines that the information is required, the communication apparatus generates the Configuration Request packet indicating (i) the request for information including at least an IP address about the communication layer upper than the communication layer of the wireless LAN, in addition to (ii) the request for the communication parameter used for connection based on the wireless LAN, and
in a case where the communication apparatus determines that the information including at least the IP address is not required, the communication apparatus generates the Configuration Request packet indicating the request for the communication parameter used for connection based on the wireless LAN.

3. The communication apparatus according to claim 1, wherein the processing for sharing the public key to be used in the communication parameter sharing processing is processing for sharing the public key such that one of the provision apparatus and the communication apparatus captures a two-dimensional matrix barcode for the other of the provision apparatus and the communication apparatus.

4. The communication apparatus according to claim 1, wherein the communication parameter used for connection based on the wireless LAN includes at least one of a Service Set Identifier (SSID), an encryption method, an encryption key, an authentication method, and an authentication key.

5. A communication method comprising:
executing processing for sharing a public key to be used in communication parameter sharing processing according to an instruction to start the communication parameter sharing processing using a wireless-network-device provisioning protocol;
performing authentication to execute authentication processing with a provision apparatus by using the shared public key, the provision apparatus being configured to provide a communication parameter; after the authentication processing and in a case where a predetermined condition is met, generating one wireless-network-device-provisioning-protocol Configuration Request packet indicating (i) a request for information including at least an Internet Protocol (IP) address about a communication layer upper than a communication layer of a wireless Local Area Network (LAN), in addition to (ii) a request for a communication parameter used for connecting to another apparatus based on the wireless LAN;
transmitting the generated Configuration Request packet to the provision apparatus;
receiving one wireless-network-device-provisioning-protocol Configuration Response packet transmitted from the provision apparatus in response to the Configuration Request packet transmitted by the communication apparatus; and setting, at the communication apparatus, the communication parameter used for connection based on the wireless LAN acquired from the Configuration Response packet received and the information including at least the IP address about the communication layer upper than the communication layer of the wireless LAN.

6. A non-transitory computer-readable storage medium that stores a program for causing a computer included in a communication apparatus to:
receive an instruction to start communication parameter sharing processing using a wireless-network-device provisioning protocol;
execute processing for sharing a public key to be used in the communication parameter sharing processing according to the instruction;
execute authentication processing with a provision apparatus by using the public key shared in the processing executed by the processing for sharing a public key, the provision apparatus being configured to provide a communication parameter;
after the authentication processing and in a case where a predetermined condition is met, generate one wireless-network-device-provisioning-protocol Configuration Request packet indicating (i) a request for information including at least an Internet Protocol (IP) address about a communication layer upper than a communication layer of a wireless Local Area Network (LAN), in addition to (ii) a request for a communication parameter used for connecting to another apparatus based on the wireless LAN;
transmit the Configuration Request packet generated by the generating to the provision apparatus;
receive one wireless-network-device-provisioning-protocol Configuration Response packet transmitted from the provision apparatus in response to the Configuration Request packet transmitted by the communication apparatus; and
set, at the communication apparatus, the communication parameter used for connection based on the wireless LAN acquired from the Configuration Response packet received and the information including at least the IP address about the communication layer upper than the communication layer of the wireless LAN.

7. A communication apparatus comprising:
one or more processors; and
one or more memories including instructions that, when executed by the one or more processors, cause the communication apparatus to:
receive an instruction to start communication parameter sharing processing using a wireless-network-device provisioning protocol;
execute processing for sharing a public key to be used in the communication parameter sharing processing according to the instruction;
execute authentication processing with a reception apparatus by using the public key shared in the processing executed by the communication apparatus, the reception apparatus being configured to receive a communication parameter;
after the authentication processing, receive, from the reception apparatus, one wireless-network-device-provisioning-protocol Configuration Request packet indicating (i) a request for information including at least an Internet Protocol (IP) address about a communication layer upper than a communication layer of a wireless Local Area Network (LAN), in addition to (ii) a request for a communication parameter used for connecting to another apparatus based on the wireless LAN; and
transmit, to the reception apparatus in response to the Configuration Request packet received by the communication apparatus, one wireless-network-device-provisioning-protocol Configuration Response packet including (i) the communication parameter used for connection based on the wireless LAN and (ii) the information including at least the IP address about the communication layer upper than the communication layer of the wireless LAN,
wherein the Configuration Response packet is used by the reception apparatus to set, at the reception apparatus, (i) the communication parameter used for connection based on the wireless LAN acquired from the Configuration Response packet received and (ii) the information including at least the IP address about the communication layer upper than the communication layer of the wireless LAN.

8. The communication apparatus according to claim 7, wherein the processing for sharing the public key to be used in the communication parameter sharing processing is processing for sharing the public key such that one of the communication apparatus and the reception apparatus captures a two-dimensional matrix barcode code for the other of the communication apparatus and the reception apparatus.

9. The communication apparatus according to claim 7, wherein the communication parameter used for connection based on the wireless LAN includes at least one of a Service Set Identifier (SSID), an encryption method, an encryption key, an authentication method, and an authentication key.

10. A communication method comprising:
executing processing for sharing a public key to be used in communication parameter sharing processing according to an instruction to start the communication parameter sharing processing using a wireless-network-device provisioning protocol;
performing authentication to execute authentication processing with a reception apparatus by using the shared public key, the reception apparatus being configured to receive a communication parameter; after the authentication processing, receiving, from the reception apparatus, one wireless-network-device-provisioning-protocol Configuration Request packet indicating (i) a request for information including at least an Internet Protocol (IP) address about a communication layer upper than a communication layer of a wireless Local Area Network (LAN), in addition to (ii) a request for a communication parameter used for connecting to another apparatus based on the wireless LAN; and
transmitting, to the reception apparatus in response to the Configuration Request packet received by the communication apparatus, one wireless-network-device-provisioning-protocol Configuration Response packet including (i) the communication parameter used for connection based on the wireless LAN and (ii) the information about the communication layer upper than the communication layer of the wireless LAN,
wherein the Configuration Response packet is used by the reception apparatus to set, at the reception apparatus, (i) the communication parameter used for connection based on the wireless LAN acquired from the Configuration Response packet received and (ii) the information including at least the IP address about the communication layer upper than the communication layer of the wireless LAN.

11. A non-transitory computer-readable storage medium that stores a program for causing a computer included in a communication apparatus to:

receive an instruction to start communication parameter sharing processing using a wireless-network-device provisioning protocol;

execute processing for sharing a public key to be used in the communication parameter sharing processing according to the instruction;

execute authentication processing with a reception apparatus by using the public key shared in the processing executed by the communication apparatus, the reception apparatus being configured to receive a communication parameter;

after the authentication processing, receive, from the reception apparatus, a Configuration Request packet indicating (i) a request for information about a communication layer upper than a communication layer of a wireless Local Area Network (LAN), in addition to (ii) a request for a communication parameter used for connecting to another apparatus based on the wireless LAN; and transmit, to the reception apparatus in response to the Configuration Request packet received by the communication apparatus, a Configuration Response packet including (i) the communication parameter used for connection based on the wireless LAN and (ii) the information including at least an Internet Protocol (IP) address about the communication layer upper than the communication layer of the wireless LAN, wherein the Configuration Response packet is used by the reception apparatus to set, at the reception apparatus, (i) the communication parameter used for connection based on the wireless LAN acquired from the Configuration Response packet received and (ii) the information including at least the IP address about the communication layer upper than the communication layer of the wireless LAN.

* * * * *